Feb. 23, 1971 T. C. LEONARD 3,566,249

HIGH FREQUENCY MULTIPLIER EMPLOYING INDUCTORS FORMED BY AXIALLY COEXTENSIVE CONCENTRICAL SECTIONS OF COAXIAL LINES

Filed Aug. 13, 1969

INVENTOR.
THOMAS C. LEONARD

BY Gerald L Moore

ATTORNEY 3,566,249

HIGH FREQUENCY MULTIPLIER EMPLOYING INDUCTORS FORMED BY AXIALLY COEXTENSIVE CONCENTRICAL SECTIONS OF COAXIAL LINES

Thomas C. Leonard, Topsfield, Mass., assignor to Varian Associates, Palo Alto, Calif., a corporation of California Filed Aug. 13, 1969, Ser. No. 849,717
Int. Cl. H02m 5/30
U.S. Cl. 321—69 7 Claims

ABSTRACT OF THE DISCLOSURE

A high frequency multiplier is disclosed. The multiplier includes a varactor diode multiplying device connected to a low pass input network including a shunt capacitor to ground and a series connected inductor. A high pass filter network is connected as the output network of the multiplying device. The high pass network includes a series capacitor connected to the device and an inductor shunting the output terminals to ground. The first and second inductors are formed by axially coextensive concentrically disposed sections of coaxial line to provide a compact relatively easily fabricated structure.

DESCRIPTION OF THE PRIOR ART

Heretofore, frequency multiplier circuits have employed an input network and an output network connected to a varactor diode multiplier. In such prior multipliers, the input and output networks were relatively complex bandpass filters tuned for the input and multiplied output frequencies, respectively. One of the problems with these prior multipliers is that the diode mounting structure becomes a part of the tuned filter circuits such that the filter circuits are complicated by requirements of the diode mounting structure, such as heat sinking structure and D.C. bias networks.

SUMMARY OF THE PRESENT INVENTION

The principal object of the present invention is the provision of an improved frequency multiplier.

One feature of the present invention is the provision of a mounting structure for a multiplier device wherein the mounting structure includes a low pass input and a high pass output, such low pass input having a series inductor formed by a first coaxial line, and wherein the high pass output includes a shunt inductor, a portion of which is formed by a length of coaxial line disposed axially coextensive with and surrounding a portion of the first coaxial line, whereby the mounting structure is isolated from the tuned bandpass circuits of the multiplier and the resultant mounting structure is reduced in length by the axially coextensive arrangement of inductors.

Another feature of the present invention is the same as the preceding feature wherein the input network includes a capacitor shunting the input end of the series inductor to a surrounding ground plane structure.

Another feature of the present invention is the same as any one or more of the preceding features wherein a capacitor is provided between the center conductor of the first coaxial line, at the output end thereof, and one end of the second inductor, to isolate the input and output networks for D.C.

Another feature of the present invention is the same as any one or more of the preceding wherein the first inductor is approximately a quarter of an electrical wavelength long at the output frequency, to provide a high impedance choke section to decouple the input and output networks.

Other features and advantages of the present invention will become apparent upon a perusal of the following specification taken in connection with the accompanying drawings wherein:

DESCRIPTION OF THE PREFERRED EMBODIMENTS

Figure 1:
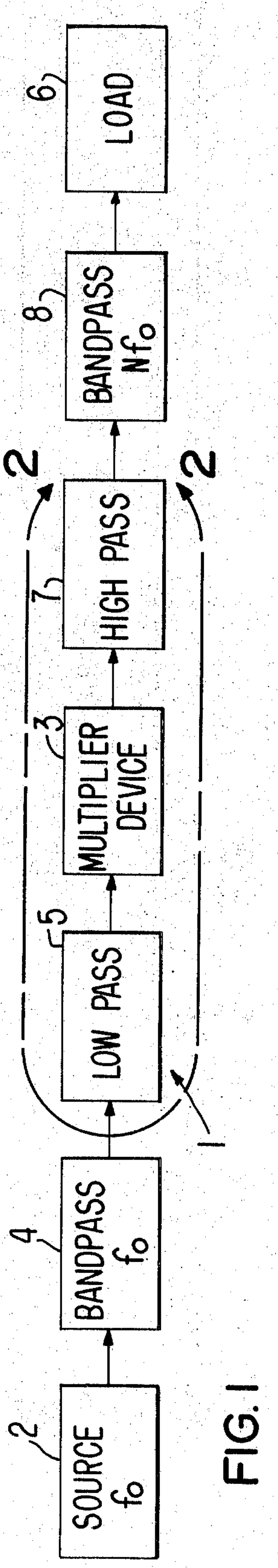
FIG. 1 is a schematic block diagram of a frequency multiplier employing features of the present invention.

Referring now to FIG. 1, there is shown a frequency multiplier 1 incorporating features of the present invention. The frequency multiplier 1 includes a source 2 of a frequency $f_0$ to be multiplied. The frequency $f_0$ to be multiplied is fed to a multiplier device 3, such as a varactor diode, via a bandpass filter 4 tuned to pass $f_0$ and to reject other spurious frequencies. The output of the bandpass filter 4 is fed to the multiplier 3 via a low pass filter 5 forming a portion of the mounting structure for the multiplier device 3, as more fully described below with regard to FIGS. 2 and 3. The low pass filter 5 facilitates fabrication of the composite circuit since it removes the multiplier mounting structure from the tuned elements of the bandpass filter 4.

The multiplier device 3 multiplies the input frequency $f_0$ to a higher multiple frequency $nf_0$, where $n$ can have any integer value. The multiplied output signal is fed to a suitable utilization device or load 6 via a high pass filter 7 and tuned bandpass filter 8. Filter 8 is tuned to pass $nf_0$ and to reject other spurious output frequencies. The high pass filter 7 forms a portion of the multiplier mounting structure and serves to isolate such structure from the tuned elements of the bandpass filter 8 to facilitate fabrication of the composite multiplier circuit 1.

Figure 2:
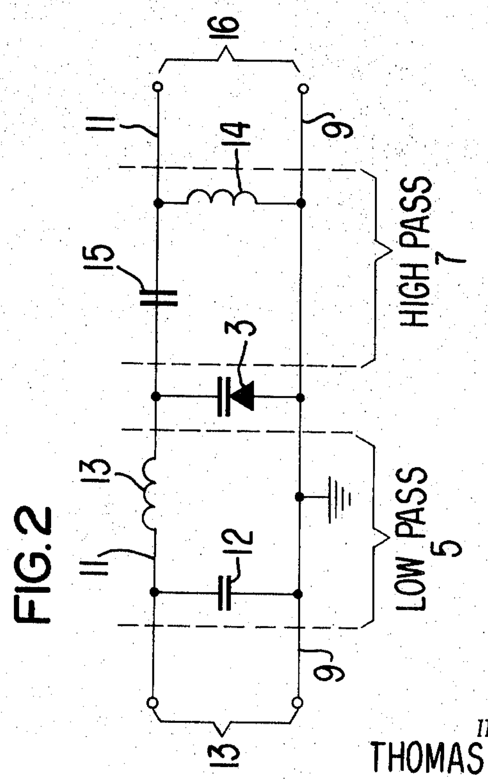
FIG. 2 is lumped element equivalent circuit diagram of a portion of the frequency multiplier circuit of FIG. 1 delineated by line 2—2.

Referring now to FIG. 2, there is shown the equivalent lumped element circuit for the multiplying device 3 and the associated low pass and high pass filters 5 and 7, respectively. More particularly, the circuit includes a common ground conductor 9 with the multiplying device 3 connected between an input conductor 11 and ground 9. The low pass filter 5 includes a capacitor 12 connected in shunt across the input terminals 13 between conductor 11 and ground 9. An inductor 13 is connected in series with conductor 11 between capacitor 12 and the multiplying device 3.

The output high pass filter network 7 includes an inductor 14 connected at one end to ground 9 and connected at its other end to the multiplying device 3 via series capacitor 15, thereby isolating the grounded inductor 14 for D.C. from conductor 11, such that D.C. bias can be applied to the multiplier via conductor 11 of the low pass filter 5. The output is attached between capacitor 15 and inductor 14 to provide a pair of output terminals 16 for connection to the input of the high frequency bandpass filter 8.

Figure 3:
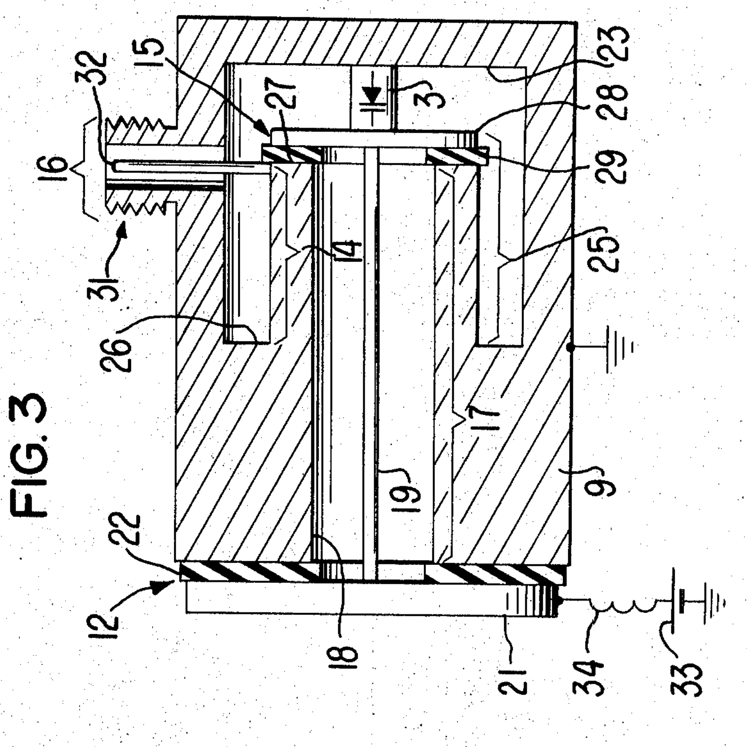
FIG. 3 is a physical realization of the circuit of FIG. 2.

Referring now to FIG. 3, there is shown the physical realization of the circuit of FIG. 2 as incorporating features of the present invention. The circuit includes a grounded conductive block structure 9 in which the multiplier device 3 is to be mounted. The low pass filter inductor 13 comprises a first length of coaxial line 17 formed by cylindrical bore 18 extending into the ground plane block 9, such that the outer conductor 18 of the coaxial line 17 is formed by the inside wall of the bore 18. An inner conductor 19 of the coaxial line 17 extends longitudinally of the bore 18 and corresponds to the inductive portion 13 of conductor 11 of FIG. 2.

The shunt capacitor 12 of the low pass filter is formed by an annular capacitive gap between a conductive disc 21, connected to the input end of the center conductor 19, and the adjacent end of the ground plane block 9. An annular insulator 22, as of Teflon, is interposed in the capacitive gap of capacitor 12. The multiplier device 3 is connected between the other end of center conductor 19 and an end wall portion 23 of the ground plane block 9.

The inductor 14 of the high pass filter output network 7 is formed by a shorted section of transmission line connected across the multiplier device 3 via the intermediary of the series capacitor 15. The inductive transmission line is folded around the first coaxial line 17 to define a shorted section of coaxial line 25 shorted by annular end wall 26. The folded coaxial line portion 25 concentrically surrounds and is axially coextensive with a portion of the first coaxial line 17, thereby forming a compact mounting structure for the multiplier device 3.

Capacitor 15 is connected between one end of the multiplying device 3 and the adjacent end of the coaxial inductor 17. Capacitor 15 is defined by an annular capacitive gap formed between the end 27 of the outer conductor 18 of the coaxial line 17 and the mutually opposed surface area of a conductive disc 28 carried on the end of center conductor 19. An annular insulative member 29, as of Teflon, is interposed in the annular capacitive gap 15. Output energy is extracted from the inductor 14 via a suitable device such as an output coaxial line 31 having its center conductor 32 extending across the inductor 14 and connected at its end to the center conductor portion of the coaxial line portion 25.

D.C. bias potential with respect to ground is derived from a source 33, and applied to the multiplier device 3 via a path which includes an R.F. choke 34, conductive disc 21, center conductor 19, and disc 28. The characteristic impedance of the coaxial line 17 and its length are dimensioned to be approximately a quarter of an electrical wavelength long at the output frequency of the multiplier such that the low pass filter network is decoupled from the high frequency energy in the high pass filter network.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a frequency multiplier apparatus, means forming a frequency multiplying device, means forming a low pass filter input network coupled to said multiplier device for applying high frequency energy of a frequency to be multiplied to said device to produce a multiplied output frequency, means forming a high pass filter output network coupled to said multiplier device for extracting the multiplied output frequency, the improvement comprising, means forming a conductive ground plane structure, said low pass input network including a first inductor and a first capacitor, said first inductor being formed by a length of coaxial line having an outer conductor forming a portion of said ground plane structure and an inner conductor insulated from said outer conductor, said first capacitor being disposed at a first end of said first inductor and capacitively connecting said inner conductor to said ground plane structure, said high pass output network including a second inductor and a second capacitor, said second inductor having a portion formed by a shorted length of second coaxial line having an inner conductor and an outer conductor both forming a portion of said ground plane structure, said second coaxial line being disposed axially coextensive with and surrounding a portion of said first coaxial line, said second capacitor being connected at the second end of said first inductor between said inner and outer conductors thereof, and said multiplier device being connected at the second end of said first inductor between said inner conductor thereof and said ground plane structure.

2. The apparatus of claim 1 wherein said ground plane structure includes a portion extending across said outer conductor of said second coaxial line to define an end wall of said ground plane structure, and wherein said multiplier device is connected in between said end wall portion of said ground plane structure and said inner conductor of said first inductor.

3. The apparatus of claim 1 including means coupled to the high energy fields within said second inductor for coupling energy therefrom to a load.

4. The apparatus of claim 1 wherein said first capacitor includes a conductor disc connected to said inner conductor of said first inductor and axially spaced from and overlaying an annular portion of said outer conductor of said first inductor to define a capacitive gap therebetween.

5. The apparatus of claim 1 wherein said second capacitor includes a conductive disc connected to said inner conductor of said first inductor and axially spaced from and overlaying an annular portion of said outer conductor of said first inductor to define a capacitive gap therebetween.

6. The apparatus of claim 1 wherein said first coaxial line has an electrical length of approximately a quarter wavelength at the multiplied output frequency.

7. The apparatus of claim 1 including means forming a source of energy of a frequency to be multiplied by said multiplying device, means forming a bandpass filter having a pass band at the frequency to be multiplied and connected intermediate said source and said low pass filter network, means forming a second bandpass filter having a pass band at the multiplied output frequency and being connected to said high pass filter network.

References Cited

UNITED STATES PATENTS

| | | | |
|---|---|---|---|
| 3,194,976 | 7/1965 | Ludwig et al. | 307—88.5 |
| 3,196,339 | 7/1965 | Walker et al. | 321—69W |
| 3,443,199 | 5/1969 | Collins et al. | 321—69W |

J D MILLER, Primary Examiner

G. GOLDBERG, Assistant Examiner

U.S. Cl. X.R.

333—76